US008837712B2

(12) United States Patent
Miller, III et al.

(10) Patent No.: US 8,837,712 B2
(45) Date of Patent: *Sep. 16, 2014

(54) METHOD FOR EXTENDING ETHERNET OVER TWISTED PAIR CONDUCTORS AND TO THE TELEPHONE NETWORK AND PLUG-IN APPARATUS FOR SAME EMPLOYING STANDARD MECHANICS

(75) Inventors: William V. Miller, III, South Riding, VA (US); Gary M. Miller, Kearneysville, WV (US); David O. Corp, Clifton, VA (US)

(73) Assignee: Hubbell Incorporated, Shelton, CT (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/235,014

(22) Filed: Sep. 16, 2011

(65) Prior Publication Data
US 2012/0002666 A1 Jan. 5, 2012

Related U.S. Application Data

(63) Continuation of application No. 11/819,715, filed on Jun. 28, 2007, now Pat. No. 8,023,642.

(60) Provisional application No. 60/816,867, filed on Jun. 28, 2006.

(51) Int. Cl.
*H04M 1/00* (2006.01)
*H04L 12/40* (2006.01)
*H04L 29/06* (2006.01)

(52) U.S. Cl.
CPC ........... *H04L 12/40032* (2013.01); *H04L 69/08* (2013.01)
USPC ..................................................... 379/413.02

(58) Field of Classification Search
None
See application file for complete search history.

(56) References Cited

U.S. PATENT DOCUMENTS

| | | | |
|---|---|---|---|
| 4,783,581 A | 11/1988 | Flowers et al. | |
| 5,366,388 A | 11/1994 | Freeman et al. | |
| 5,539,820 A | 7/1996 | Pistilli | |
| 5,790,363 A | 8/1998 | Chaudhry | |
| 6,072,683 A | 6/2000 | Masghati | |
| 6,108,331 A | 8/2000 | Thompson | |
| 6,154,774 A | 11/2000 | Furlong et al. | |
| 6,252,754 B1 * | 6/2001 | Chaudhry | 361/111 |
| 6,328,480 B1 | 12/2001 | Strike | |
| 6,385,030 B1 * | 5/2002 | Beene | 361/119 |

(Continued)

OTHER PUBLICATIONS

Cisco Systems Data Sheet for G.SHDSL WAN interface card (WIC) dated 2005 p. 1-10.*

(Continued)

*Primary Examiner* — Fan Tsang
*Assistant Examiner* — Jeffrey Lytle
(74) *Attorney, Agent, or Firm* — Stacey J. Longanecker; Mark S. Bicks; Alfred N. Goodman

(57) ABSTRACT

An Ethernet extension device is provided for metro or last mile Ethernet service via twisted pairs as opposed to fiber optics. The Ethernet extension device is implemented as a plug-in extension for existing infrastructure (e.g., in a standard electrical wall box or Type-200™ Mechanics card) that employs lighting and power cross protection required by the telephone companies for Ethernet connectivity to the telephone network (e.g., for connection between a user's building and a telephone company building over existing outdoor telephone cables).

24 Claims, 14 Drawing Sheets

(56) References Cited

U.S. PATENT DOCUMENTS

| | | | |
|---|---|---|---|
| 6,404,861 B1* | 6/2002 | Cohen et al. | 379/93.01 |
| 6,420,964 B1 | 7/2002 | Nishikawa et al. | |
| 6,470,053 B1 | 10/2002 | Liu | |
| 6,472,992 B1* | 10/2002 | Kiko | 340/653 |
| 6,483,902 B1 | 11/2002 | Stewart et al. | |
| 6,543,940 B2 | 4/2003 | Chu | |
| 6,621,974 B1 | 9/2003 | Chu | |
| 6,639,779 B2 | 10/2003 | Knigge et al. | |
| 6,640,270 B1 | 10/2003 | Wang | |
| 6,724,750 B1* | 4/2004 | Sun | 370/352 |
| 6,780,047 B1 | 8/2004 | Laity et al. | |
| 6,810,041 B2 | 10/2004 | Walker, III et al. | |
| 6,839,872 B2 | 1/2005 | Kohda | |
| 6,854,895 B2 | 2/2005 | Coffey et al. | |
| 6,880,982 B2 | 4/2005 | Imamura | |
| 6,882,514 B2 | 4/2005 | Mutunga et al. | |
| 6,885,796 B2 | 4/2005 | Lubkert et al. | |
| 6,909,834 B2 | 6/2005 | Tomino et al. | |
| 7,423,859 B1 | 9/2008 | Wierzbicki et al. | |
| 7,693,133 B2* | 4/2010 | Benco et al. | 370/352 |
| 2002/0089973 A1 | 7/2002 | Manor | |
| 2003/0137973 A1* | 7/2003 | Kim et al. | 370/352 |
| 2004/0120310 A1 | 6/2004 | Rothenhofer et al. | |
| 2004/0131064 A1 | 7/2004 | Burwell et al. | |
| 2004/0151212 A1 | 8/2004 | Gerszberg et al. | |
| 2004/0252436 A1* | 12/2004 | Kucharski | 361/119 |
| 2005/0010954 A1 | 1/2005 | Binder | |
| 2005/0053087 A1 | 3/2005 | Pulyk | |
| 2005/0078427 A1* | 4/2005 | Castro | 361/119 |
| 2006/0007614 A1* | 1/2006 | Pozzuoli et al. | 361/62 |
| 2006/0159129 A1 | 7/2006 | Schmidt | 370/493 |
| 2006/0185878 A1* | 8/2006 | Soffer | 174/50 |
| 2006/0209886 A1* | 9/2006 | Silberman et al. | 370/466 |
| 2007/0104227 A1* | 5/2007 | Rivera | 370/493 |
| 2007/0189495 A1 | 8/2007 | Crawley et al. | |
| 2007/0254714 A1 | 11/2007 | Martich et al. | |
| 2007/0286172 A1* | 12/2007 | Duran et al. | 370/356 |
| 2008/0248684 A1 | 10/2008 | Filipon et al. | |

OTHER PUBLICATIONS

"Patton's Award-Winning Ethernet Extender Solutions Extend Long-Range Ethernet Farther & Faster," Copyright © 2001-2006, Patton Electronics Co., pp. 3, sales@patton.com.

"Model 2155 CopperLink 144-kbps Ethernet Extender the Perfect LAN Extender for Those Long-Haul Applications," Copyright © 2001-2006, Patton Electronics Co., pp. 2, sales@patton.com.

* cited by examiner

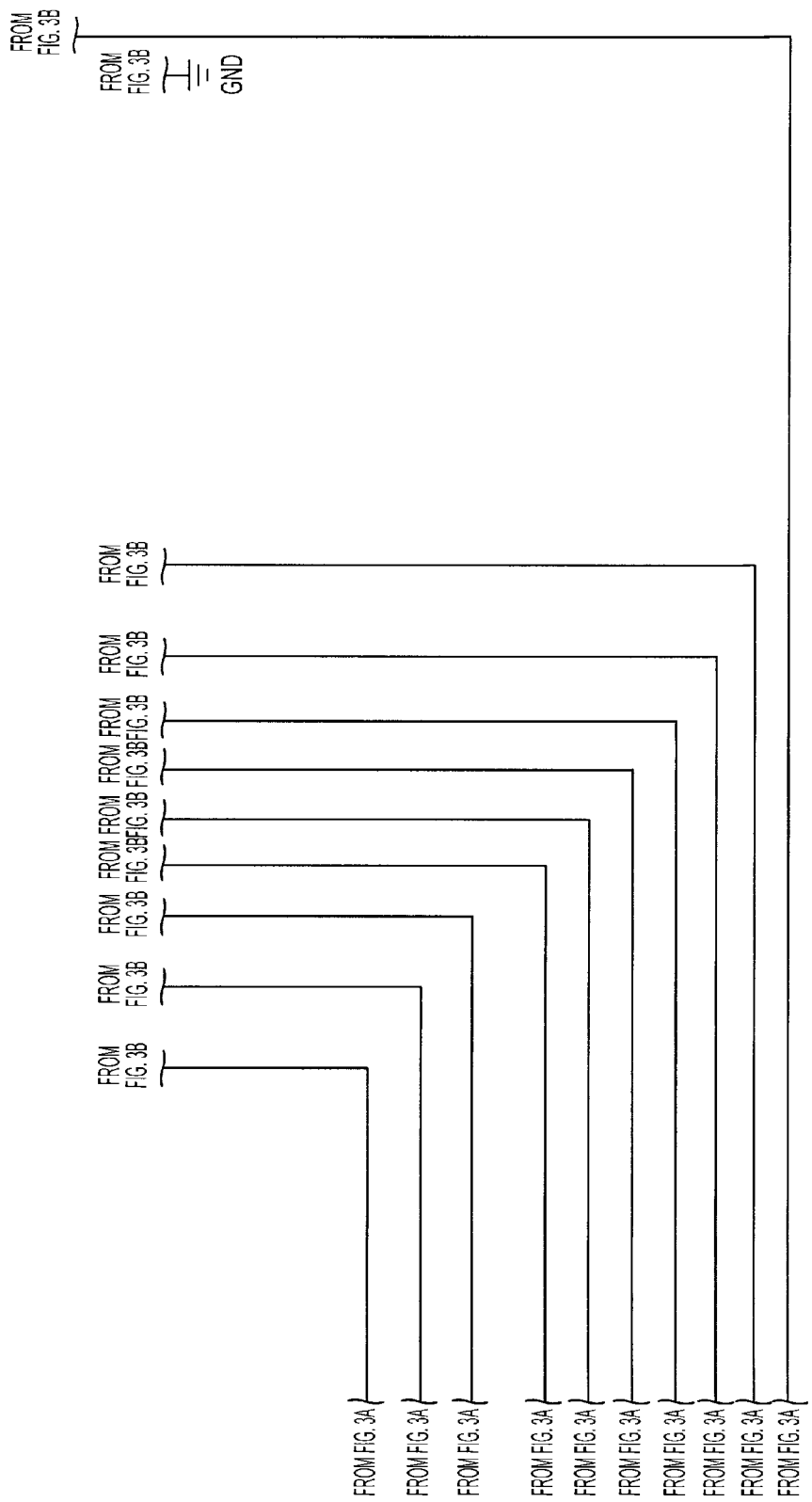

METHOD FOR EXTENDING ETHERNET OVER TWISTED PAIR CONDUCTORS AND TO THE TELEPHONE NETWORK AND PLUG-IN APPARATUS FOR SAME EMPLOYING STANDARD MECHANICS

This application is a continuation of U.S. patent application Ser. No. 11/819,715, filed Jun. 28, 2007 (now U.S. Pat. No. 8,023,642), which claims the benefit under 35 U.S.C. 119(e) of U.S. provisional application Ser. No. 60/816,867, filed Jun. 28, 2006; the entire contents of which are incorporated herein by reference.

FIELD OF THE INVENTION

The present invention relates generally to providing Ethernet access using existing communications infrastructure. More particularly, a plug-in Ethernet extension apparatus and method of using same are provided to extend Ethernet over twisted pair and to provide Ethernet connectivity to the telephone network via existing copper wire infrastructure using standard mechanics such as a standard electrical wall box or standard telecommunications equipment shelf card.

BACKGROUND OF THE INVENTION

Existing Ethernet connections are limited to less than 350 feet to avoid signal degradation. While Ethernet extension devices are available to extend this range, these devices are generally packaged as "desktop boxes" otherwise known as "pizza box" solutions that increase clutter, increase installation complexity and/or can be removed by unauthorized personnel. WiFi wireless extensions are also limited to a few hundred feet in range, often have the same disadvantages of desktop or set top boxes, and raise security and interference concerns. A need therefore exists for an Ethernet extension technology that is packaged as a plug-in or standard electrical wall box to overcome these disadvantages.

In addition, according to dBrn Associates, Inc., an independent telecommunications consulting firm, "95% of data traffic begins and/or ends on an Ethernet interface." It is not surprising, then, that Ethernet service offerings are growing while other data services stagnate. AT&T's Ethernet business grew by 100% in 2004.

Since common Ethernet speeds of 10 and 100 Mb/s are significantly faster than T1, which is currently the highest universally supported speed on copper, fiber optics is the primary means of providing Ethernet connectivity. Ethernet over fiber is beginning to have an impact on traditional SONET fiber transport. In a June 2005 report, the Information Data Corporation (IDC) (i.e., a subsidiary of Information Data Group, a global technology media, research, and events company) predicted that "the migration from . . . SONET . . . to Ethernet is well under way. Growth over the next five years will be substantial and metro [last mile] Ethernet represents one of the most significant opportunities in wireline telecom infrastructure." IDC predicts that the metro Ethernet market will surpass the metro SONET market by 2010.

Yet, for all of the merits of fiber optics, and even considering new efforts to provide residential fiber service, little recent progress has been made to serve additional business locations with fiber optics. Fiber optics continues to reach less that 15% of domestic commercial sites. In fact, of the 750,000 business-use buildings in this country containing more than 20 workers, only about 5% have access to fiber optics, according to Ryan Hankin Kent (RHK) which provides telecommunications consulting.

Many companies now offer Ethernet-over-copper equipment products. While each has viable technology and most have had some market success, the products are either platform-based or box-based, and lack the plug-and-play simplicity of T1 and HDSL repeaters. To telephone companies (hereinafter referred to as "Telcos"), these products appear as yet another "network solution" or "pizza box" rather than a plug-in extension for existing infrastructure.

Products that provide Ethernet over twisted pair have been in existence for several years. Most are "pizza box" or shelf-based systems designed for efficient delivery of multiple Ethernet links. Some take the form of Integrated Access Devices (IADs). Others are designed for Multi-Tenant Units (MTUs) to distribute Ethernet to multiple users within a building. With few exceptions, vendors have generally marketed to Competitive Local Exchange Carriers (CLECs) and smaller Incumbent Local Exchange Carriers (ILECs) to avoid the long standardization cycles and the daunting relationship development required to sell to the RBOCs. One exception is XEL, recently purchased by Verilink. XEL's long relationship with GTE drove Verizon standardization of the Shark IAD. The Shark IAD provides Ethernet, low speed data and POTS/SPOTS over a two T1 link. The Verizon GTE acquisition paved the way for significant use of the Shark IAD (i.e., now a Verilink product) throughout the Verizon network.

Over all, however, such integrated products are problematic when compared with traditional RBOC "one-at-a-time" discrete CO or DLC-based topologies in terms of cost, administration and maintenance. However, for CLECs, IAD-type devices permit use of a leased T1 line to carry multiple voice and data circuits less expensively than individually leasing the same services from the incumbent Local Exchange Carrier for resale to a prospective customer.

DSL provides Ethernet-based internet access at relatively low cost. However, while a number of companies now use "Business DSL" for web access, such activity is generally segregated from telephony and corporate LAN or WAN data. Companies exist which offer web/IP-based voice service (e.g., Vonage) that some businesses now use, but security, reliability and, in some cases, access speed concerns keep DSL and existing DSL infrastructure from being considered a viable alternative to trusted Leased Lines, Frame Relay and ATM that offer Service Level Agreement (SLA) guarantees.

Thus, a need exists for an Ethernet extension device for providing metro or last mile Ethernet service via twisted pairs as opposed to fiber optics. Further, a need exists for an Ethernet-over-copper solution that has the plug-and-play simplicity of T1 and HDSL.

Finally, there exist Ethernet-over-copper products with similar functions (e.g., products offered by Patton Electronics in Germantown, Md.). These products, however, are not intended for mounting in a wall box, and they are not intended for interfacing to the phone network. They do not provide, for example, telco-required lightning protection which would permit them to interface to the telephone network. Other competitors such as Actellis, Lucent, Cisco, and others do have telephone network-compatible interfaces; however, they are large, expensive systems, and difficult to install. Thus, a need exists for a Ethernet-over-copper extension device that has plug-in capability (e.g., is implemented as a standard electrical wall box or plug-in card), and that can interface with the telephone network (i.e., has certification for lighting and power cross protections).

SUMMARY OF THE INVENTION

The above disadvantages are avoided and other advantages are realized by an apparatus and method according to the present invention. According to an exemplary embodiment of the present invention, Ethernet extension technology is implemented in a standard plug-in telecommunications equipment shelf card or a standard electrical wall box to overcome these disadvantages.

According to an aspect of an exemplary embodiment of the present invention, an Ethernet extension device is configured to provide metro or last mile Ethernet service via twisted pairs as opposed to fiber optics.

According to another aspect of an exemplary embodiment of the present invention, an Ethernet extension device is implemented as a plug-in extension for existing infrastructure (e.g., in a standard electrical wall box or Type-200™ or Type-400™ Mechanics card) that employs lighting and power cross protection required by the telephone companies for Ethernet connectivity to the telephone network (e.g., for connection between a user's building and a telephone company building over existing outdoor telephone cables).

BRIEF DESCRIPTION OF THE DRAWINGS

The invention will be more readily understood with reference to the embodiments thereof illustrated in the attached drawing figures, in which.

In the drawing figures, it will be understood that like numerals refer to like features and structures.

DETAILED DESCRIPTION OF THE EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As will be described in more detail below, exemplary embodiments of the present invention provide Ethernet extension devices that are low initial cost, use standard mechanics and are simple to use while providing comprehensive capabilities. For example, exemplary embodiments of the Ethernet extension devices of the present invention allow for Ethernet connectivity to twisted pair within a building and, more importantly, to the telephone network (i.e., via wires that leave the building). In accordance with an exemplary embodiment of the present invention, an Ethernet extension device is implemented as a plug-in extension for existing infrastructure (e.g., in a standard wall box or Type-200™ or Type-400™ Mechanics card) and employs lighting and power cross protection required by the telephone companies. This is in contrast to certain existing Ethernet extension devices that do not provide requisite protection for interfacing with the telephone network.

Figure 1:
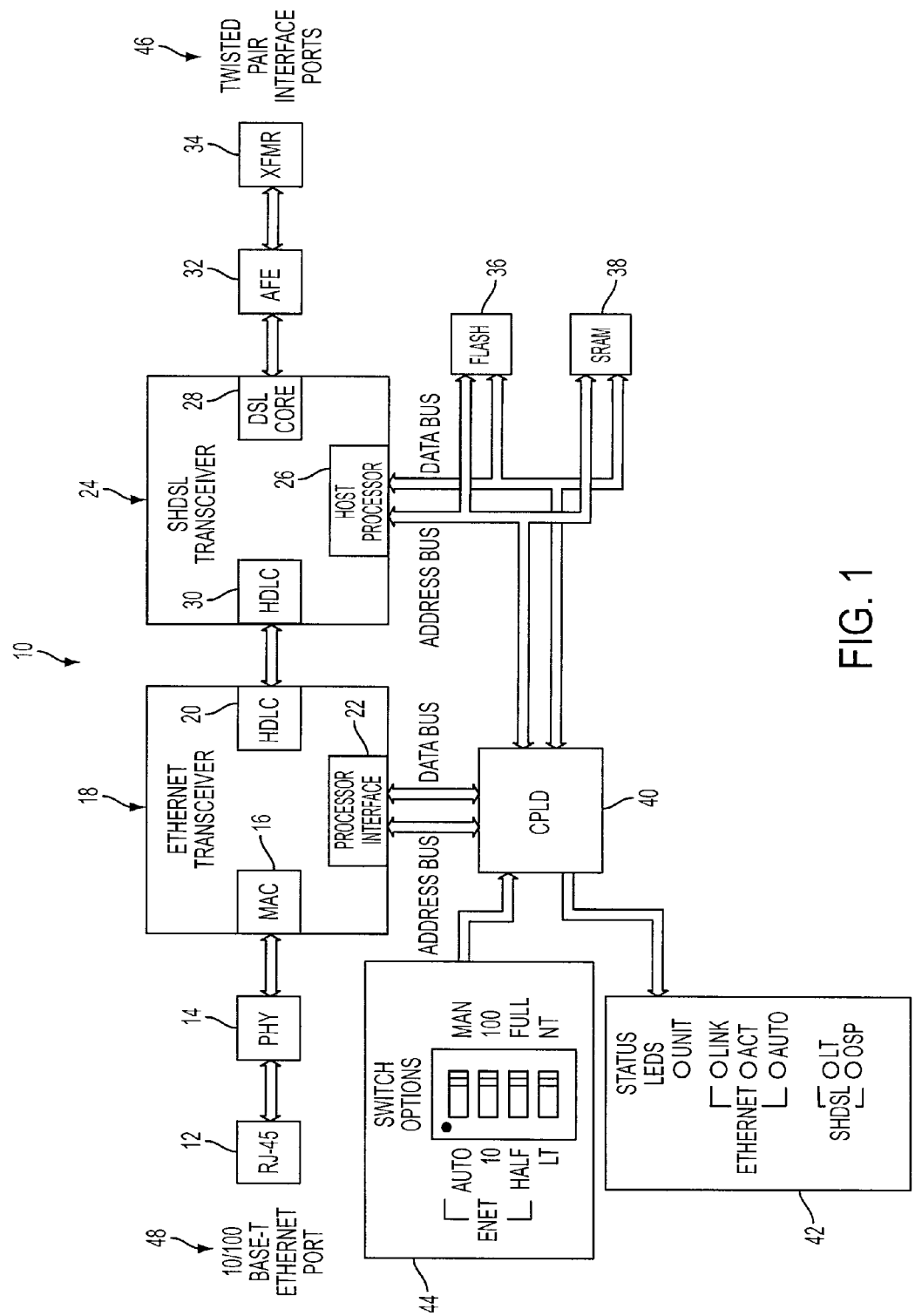
FIG. 1 is a block diagram of an Ethernet extension device constructed in accordance with an exemplary embodiment of the present invention.

FIG. 1 depicts a block diagram of an exemplary embodiment of the present invention. The components in the block diagram can be provided in different plug-in type structures (e.g., standard electrical wall boxes or Type-200™ or Type-400™ Mechanics or other standard telecommunications equipment shelf card), as depicted in FIGS. 4-6. As shown in FIG. 1, RJ45 is a connector 12. It is the standard connector used for an Ethernet interface.

With further reference to FIG. 1, a physical interface PHY 14 is provided. The physical interface PHY 14 is preferably an integrated circuit that receives the electrical signal on the Ethernet cable connected to the connector 12 and converts it to standard digital levels. The Ethernet PHY 14 implements the physical layer of the seven layer OSI model, and provides the physical link to the 10/100BaseT twisted pair interface. As described below, an Ethernet Media Access Controller (MAC) 16 is implemented within an Ethernet transceiver 18. The MAC 16 and PHY 14 are preferably linked via a Media Independent Interface (MII).

The Ethernet transceiver 18 in FIG. 1 is preferably a single integrated circuit that implements several functions. The MAC 16 implements the standard function of monitoring for communication collisions on a corresponding local area network (LAN) and retransmitting corrupted data packets. The High-level Data Link Control (HDLC) interfaces 20 and 30 provide a serial data interface. These devices 20 and 30 are responsible for collecting data into packets for transmission, adding error checking overhead, and generally tracking the progress data transmission. The receiver side of the HDLC interfaces 20 and 30 find the beginning and end of packets, check for errors, strip the overhead, and provide the user data to a processor described below. The HDLC format is used as a convenient mechanism to transfer data between the Ethernet transceiver 18 to an SHDSL transceiver 24 integrated circuit that is also shown in FIG. 1. The HDLC format is especially convenient since Ethernet uses the HDLC format to convey frames of data over the LAN. A processor interface 22 is also provided in FIG. 1 that allows for controlling the Ethernet transceiver 18 from a microprocessor such as the host processor 26 embedded within the SHDSL transceiver 24 described below.

The SHDSL transceiver 24 integrated circuit in FIG. 1 provides data, modulated onto a carrier toward the digital subscriber loop (DSL) interface (e.g., DSL core 28) shown on the right side of the block diagram in FIG. 1. The device 24 also preferably comprises an embedded host microprocessor 26 that serves as the master controller for the functions performed by the Ethernet extension device 10 of the present invention. The Ethernet transceiver 18 and the SHDSL transceiver 24 are preferably provided by Metalink LTD located in Yakum, Israel, but other providers of these technologies are available.

There are many varieties of DSL available today including, but not limited to, asymmetric digital subscriber loop (ADSL). ADSL is what the telephone company often uses to deliver DSL service to a home. The data rate into the home is much faster than the data rate out of the home, so it is called asymmetric. Another recent development of ADSL, that is, ADSL2+, can provide faster speeds, up to 12 Mbps, of data into the home on two twisted pair wires. In contrast, High bit-rate DSL (e.g., HDSL, HDSL2, and HDSL2+) are symmetrical data delivery technologies that are frequently used to replace standard T1 lines which operate at 1.544 Mbps in both directions. HDSL2 has the advantage of requiring only one twisted pair cable to carry data instead of the two twisted pairs cables required by T1. Thus, the telephone company can add more T1 service to a site without installing additional wire. Symmetric High bit-rate DSL or SHDSL can operate at various bit rates. The bit rate will change depending on the quality of the copper line. A long or noisy line cannot carry as much data as a short, quiet line. The SHDSL algorithms make measurements of the line at startup to determine the fastest practical data rate. Sometimes, SHDSL is referred to as G.SHDSL after the standard for SHDSL published by the International Telephony Union (ITU). The ITU specification is number G.991.2 and the "G." from the specification is frequently prefixed to the SHDSL acronym. In any event, the SHDSL standard is the preferred standard used for implementing an exemplary embodiment of the present invention.

During establishment of an optimum data rate, the SHDSL transceiver 24 in FIG. 1 modulates data preferably using Trellis Coded Pulse Amplitude Modulation (TC-PAM). The modulated analog signal is provided to the analog front end (AFE) 32 also shown in FIG. 1. The AFE 32 is a robust amplifier for the transmitter side of the SHDSL transceiver 24 and a sensitive amplifier on the receive side. A hybrid balance network at the AFE 32 and digital echo-cancellation techniques within the SHDSL transceiver 24 are used to separate the signals in the transmit and receive paths of the SHDSL transceiver 24.

A transformer XMFR 34 is depicted at the far right of the block diagram in FIG. 1. The XFMR 34 is an interface to the telephone network. The XMFR 34 described in more detail below in connection with FIG. 2.

The above-described components in FIG. 1 also operate to send signals received via the Tip and Ring inputs to the XMFR 34 to the Ethernet interface (e.g., the RJ45 connector 12). For example, the HDLC interface 20 of the Ethernet transceiver 18 receives data from the SHDSL transceiver 24 and organizes packets and adds overhead as needed for Ethernet transmission.

The host processor 26 in the SHDSL transceiver 24 depicted in FIG. 1 is preferably a microprocessor. The flash memory 36 and Static Random Access Memory (SRAM) 38 are memory used by the microprocessor 26. The flash memory 36 contains instructions and fixed data that are retained even when power is removed. The SRAM 38 is updated by the host processor 26 almost instantly, but the contents are lost when power is removed.

The Complex Programmable Logic Device (CPLD) 40 in FIG. 1 is preferably a digital logic circuit designed to coordinate components shown in FIG. 1. The logic allows the microprocessor or host processor 26 to control front panel LEDs 42 and read the state of various switches 44 on the front panel described below in connection with FIGS. 5A through 5E. The CPLD 40 also provides buffering of the address and data buses between the host processor 26 and the Ethernet transceiver 18.

In accordance with an exemplary embodiment of the present invention, the components in FIG. 1 are implemented using Type 200™ Mechanics, a trademark of Westell, Inc or similar card configuration, and is hereinafter referred to as the "EE2." The EE2 implementation preferably has two SHDSL ports for double the throughput. In accordance with another exemplary embodiment of the present invention, the components in FIG. 1 are implemented in a standard electrical wall box hereinafter referred to as the "EEB." The EE2 preferably collects performance data which the EEB version does not do since there is little room in the EEB for another port to a personal computer (PC) to report any performance data. The EE2 has two relays that will close on certain error conditions to indicate an alarm. This is often used in a telephone central office application to light a light or ring a bell. It is preferably not used in the EEB version. Finally, the EEB preferably uses a low voltage DC power input (such as 12VDC) from a small power-supply brick with integral male plug designed to plug directly into a wall outlet, while the EE2 is preferably specified to have a 48 v input (i.e., the typical power source in the telephone company applications).

As stated above, there exist Ethernet-over-copper products with similar functions to those described with respect to FIG. 1 (e.g., products offered by Patton Electronics in Germantown, Md.). These products do not provide features required by telephone companies such as lightning protection to interface to the telephone network. Thus, these products cannot be used to connect to outdoor telephone lines. Further, they are not intended for mounting in a wall box. In accordance with an aspect of an exemplary embodiment of the present invention, the telecommunications ports of the SHDSL transceiver 24 and the 10/100BaseT Ethernet transceiver 18 shown in FIG. 1 are designed to meet the electrical safety requirements of GR-1089-CORE Issue 3, October 2002. Per GR-1089, the two-wire SHDSL ports of the SHDSL transceiver 24 of FIG. 1 are preferably Type 3, while the four-wire Ethernet port of the Ethernet transceiver 18 is preferably Type 4. Type 3 ports are defined as equipment ports directly connected to metallic tip and ring outside-plant conductors, including lines that leave the premises and are intended to be located on customer premises. Type 4 ports are defined as equipment ports intended to be located on customer premises that do not directly connect to metallic tip and ring outside-plant conductors, but may serve intra-building metallic tip and ring conductors only.

Type 3 equipment ports must pass both First and Second-Level Lightning Surge tests, as well as both First and Second-Level AC Power Fault tests as described in GR-1089-CORE. In order to pass the First-Level surge and power fault tests, the equipment under test (EUT) must not be damaged and must continue to operate properly following the complete battery of tests. The EUT is considered to pass the Second level surge and power fault tests if it does not become a fire, fragmentation, or electrical safety hazard during any of the tests, with the added stipulation that wiring external to the EUT remain undamaged following the Second level power fault tests.

Type 4 equipment ports must pass Intra-Building Lightning Surge tests and Second-Level Intra-Building AC Power Fault tests as described in GR-1089-CORE. In order to pass the Intra-Building surge tests, the equipment under test (EUT) must not be damaged and must continue to operate properly following the complete battery of tests. The EUT is considered to pass the Second level Intra-Building power fault tests if it does not become a fire, fragmentation, or electrical safety hazard during any of the tests, and the wiring external to the EUT remains undamaged.

Figure 2A:
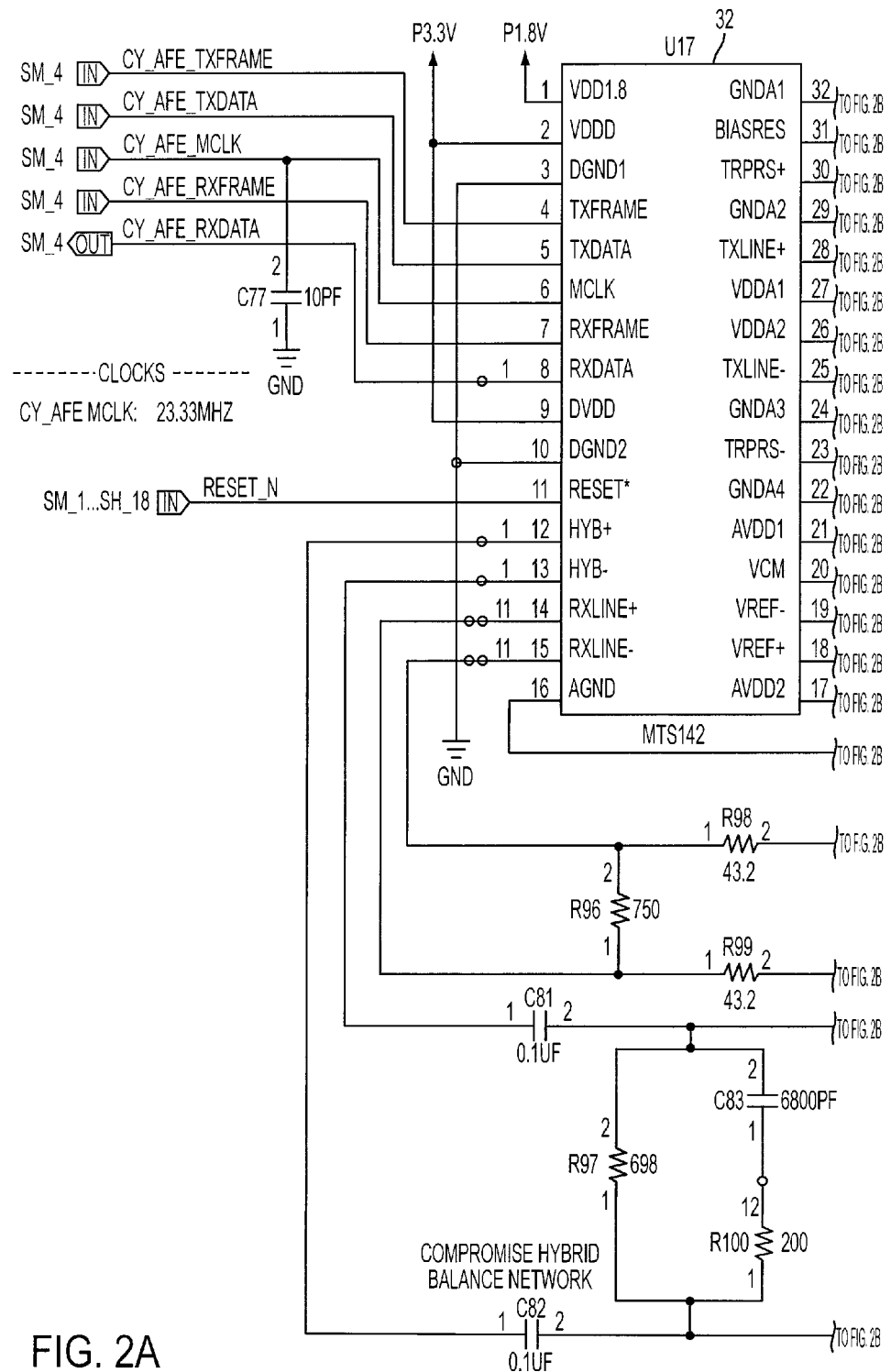
FIGS. 2 and 3 are schematic diagrams of lighting and power cross protection-type components employed by an Ethernet extension device constructed in accordance with exemplary embodiments of the present invention.
Figure 2B:
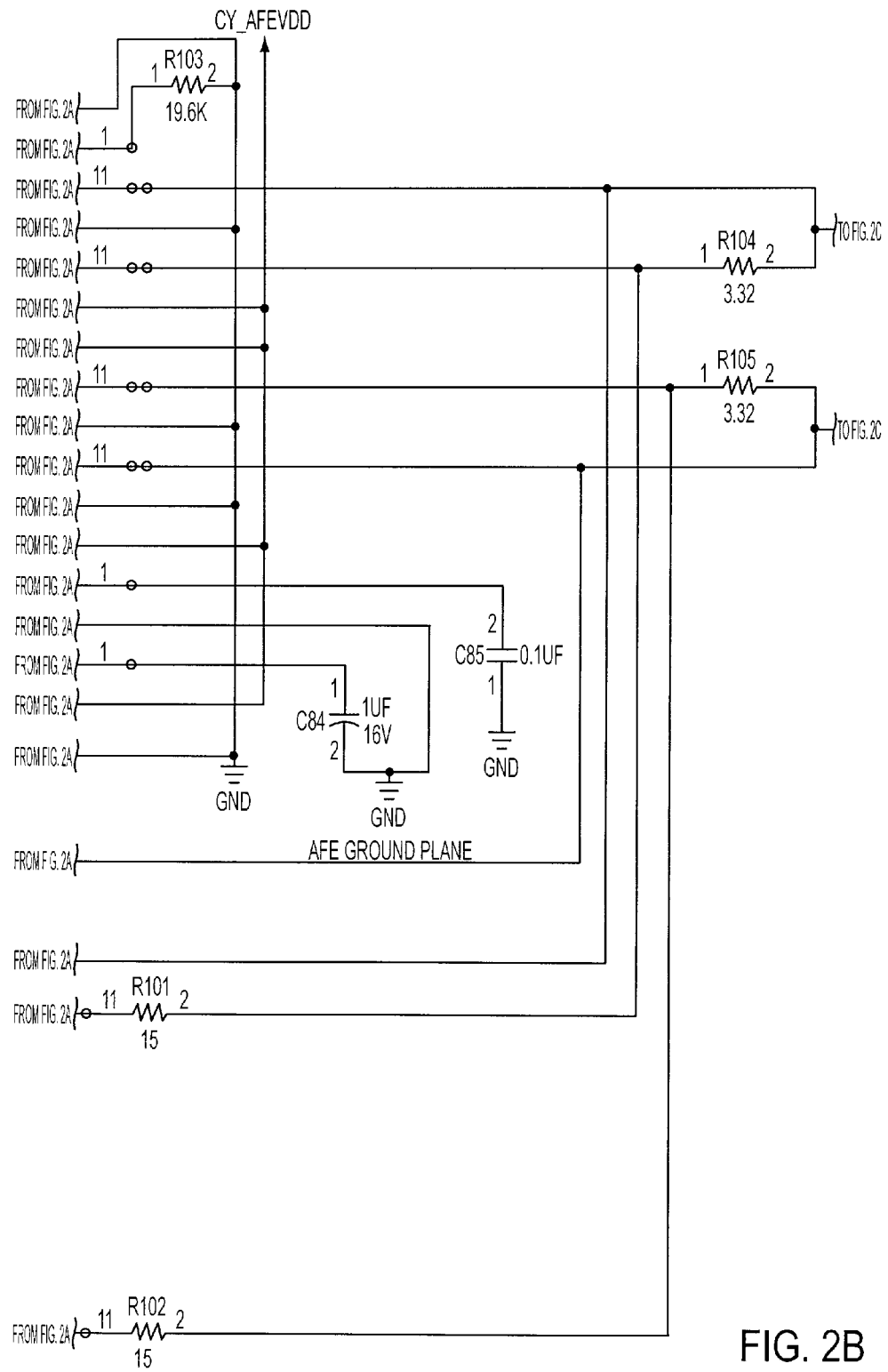
Figure 2C:
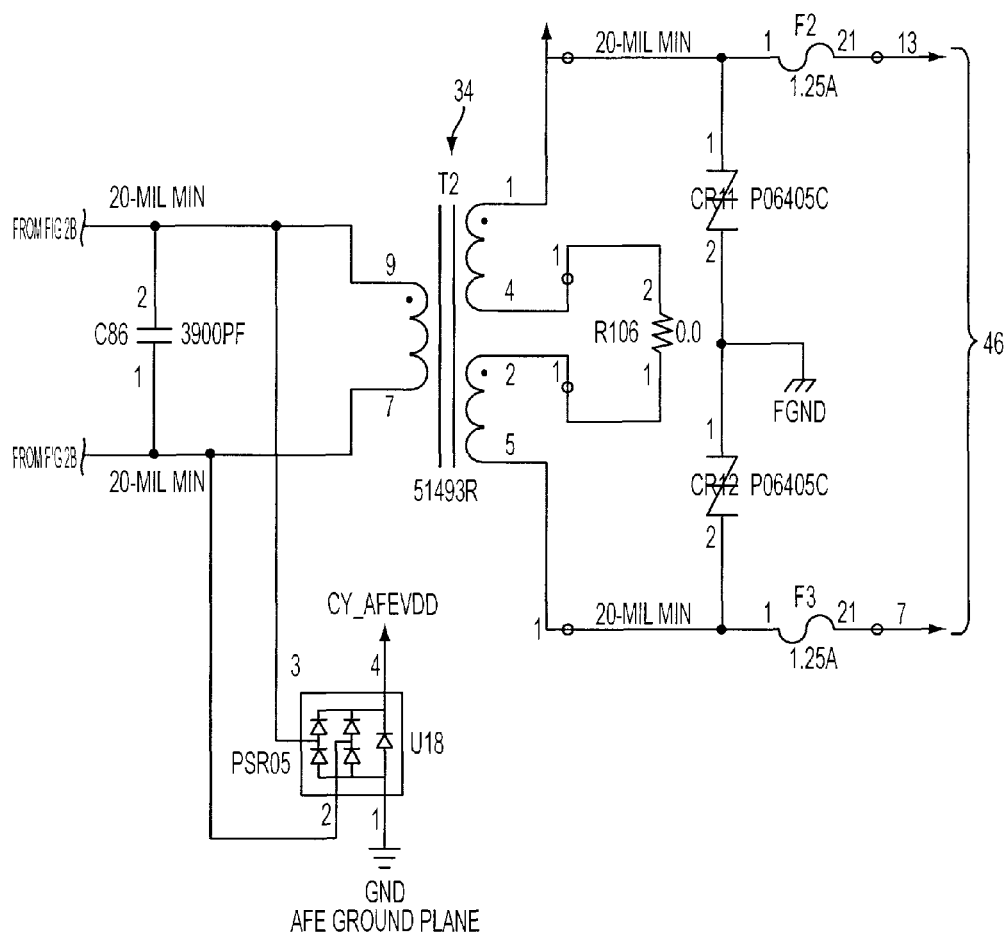
Figure 3A:
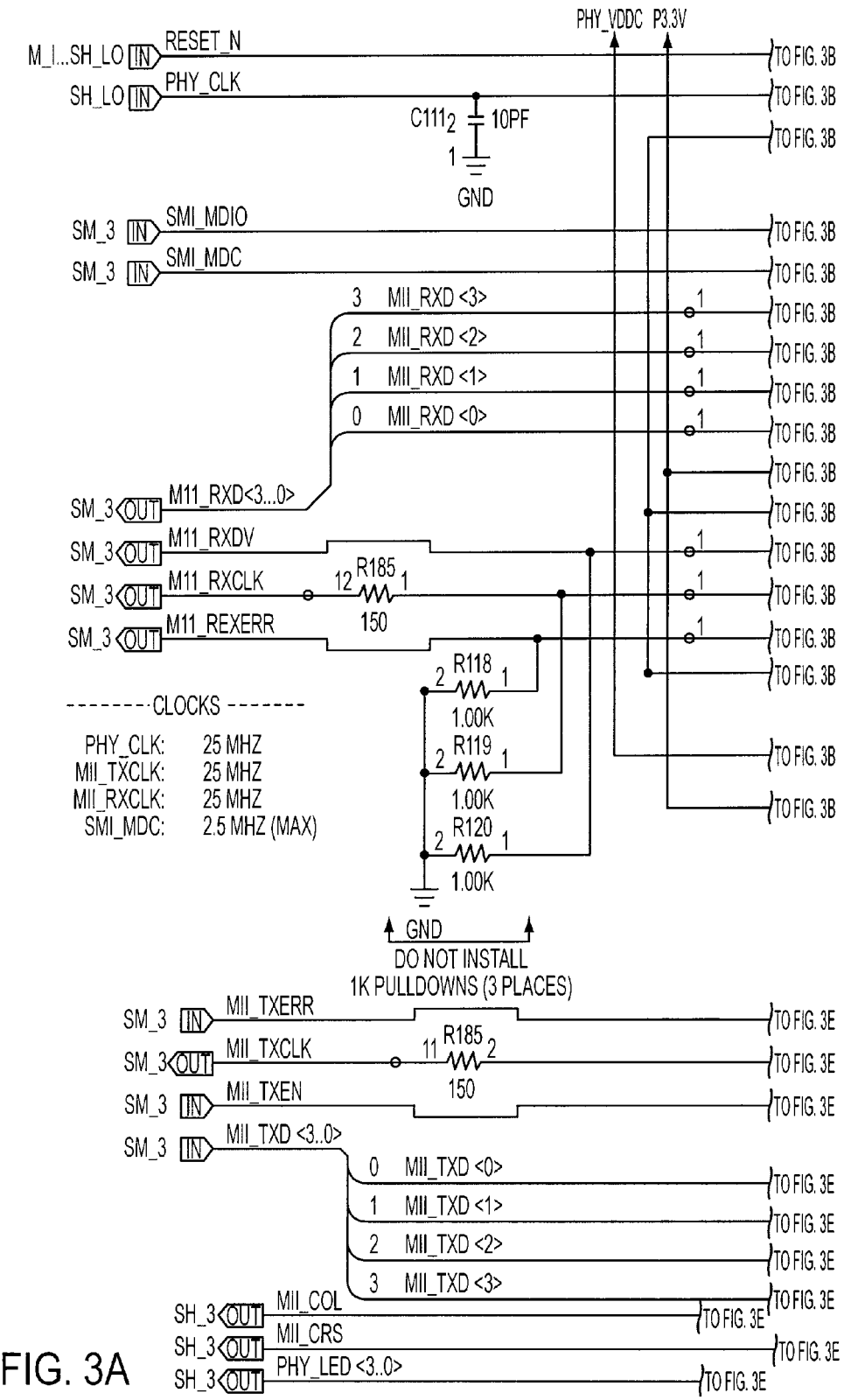
Figure 3B:
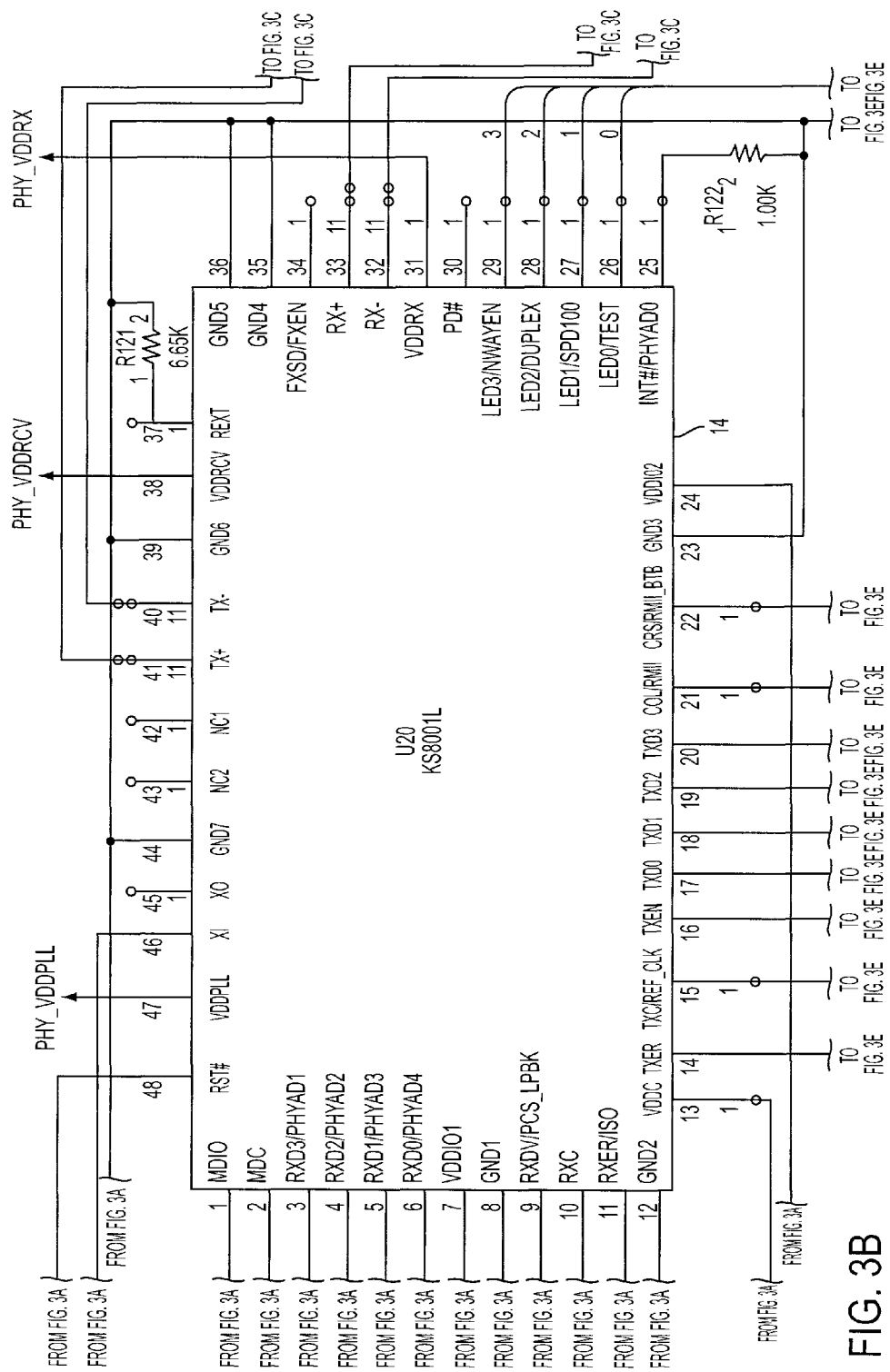
Figure 3C:
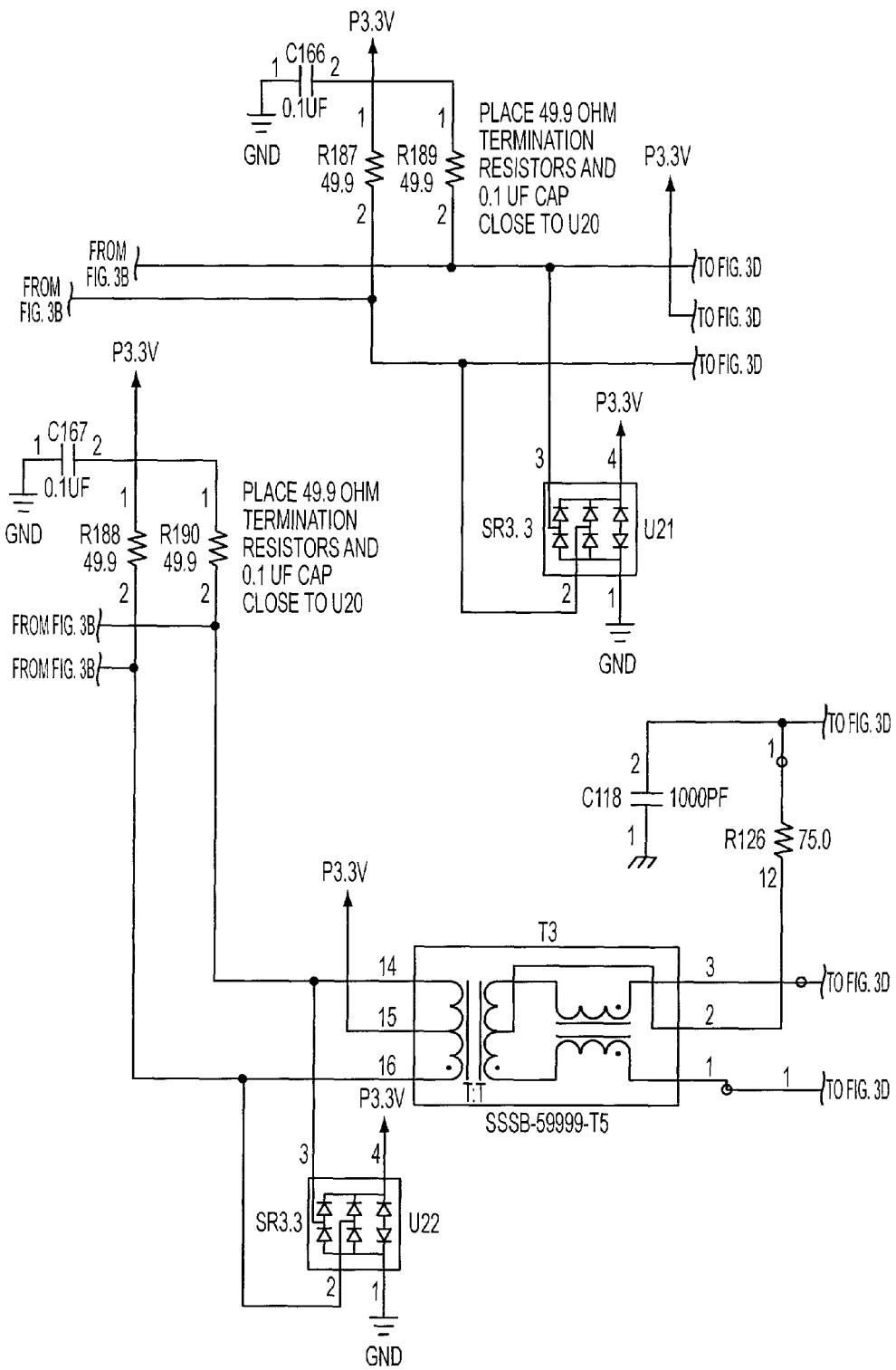
Figure 3D:
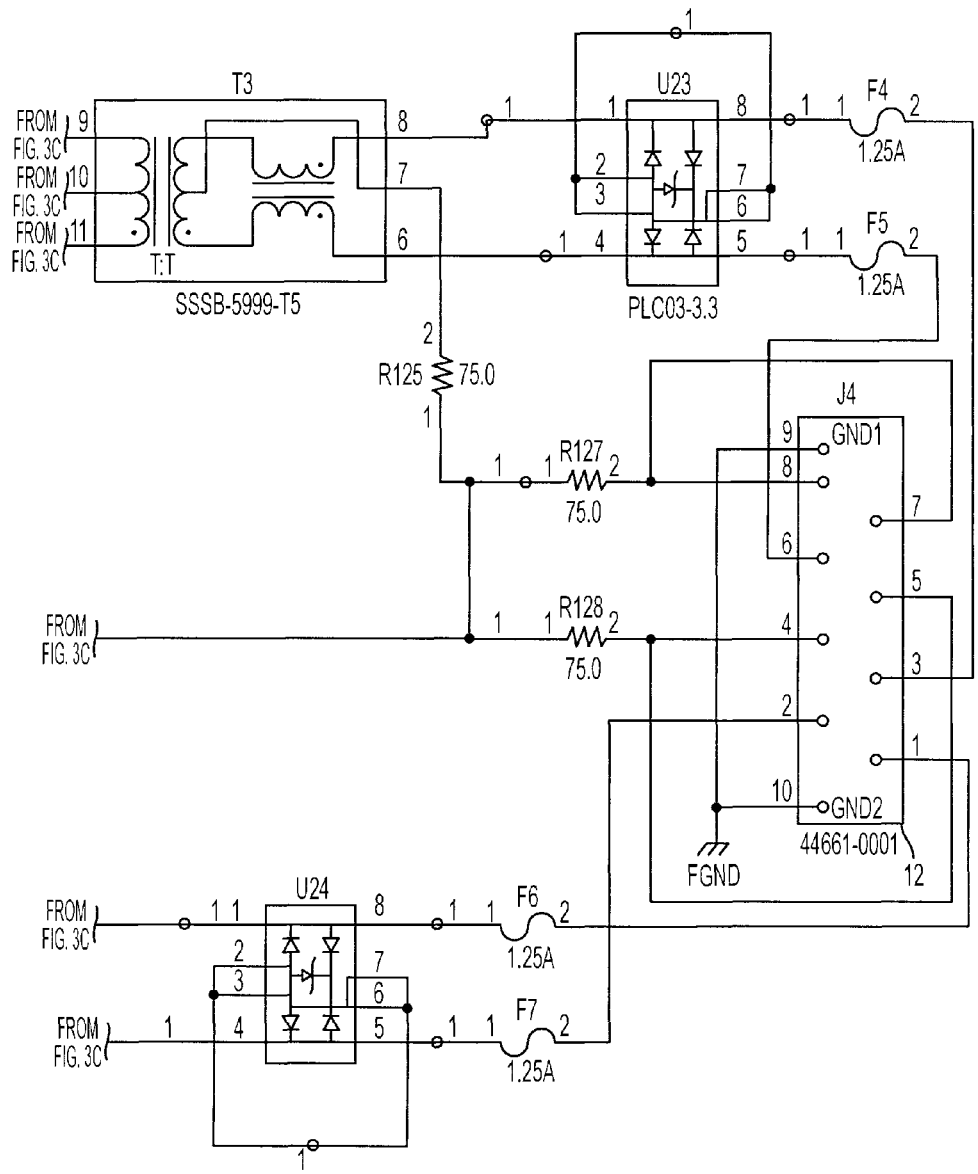

One port 46 of the two aggregate SHDSL ports of an Ethernet extension device 10 in accordance with an exemplary embodiment of the present invention is shown in the schematic diagram of FIG. 2 which depicts the AFE and the XFMR 34 of FIG. 1 in greater detail. The other SHDSL port (not shown) can also be implemented as shown in FIG. 2.

Components CR11, CR12, and U18 in FIG. 2 provide the over-voltage protection that allows the unit to survive and continue to operate properly following the battery of First-Level Lightning Surge and First-Level AC Power Fault tests. CR11 and CR12 are also instrumental in allowing the device 10 to meet the Second-Level Lightning Surge and Second-Level AC Power Fault requirements. Fuses F2 and F3 operate in conjunction with CR11 and CR12 to protect external wiring from damage during the battery of Second-Level AC Power Fault tests, as well as assure that the EUT (e.g., device 10) does not become a fire, fragmentation, or electrical safety hazard. The physical isolation of the primary and secondary windings on the XFMR 34 of FIG. 1 (i.e., indicated as T2 in FIG. 2) also provides some protection against longitudinal (common mode) surges.

Components CR11 and CR12 depicted in FIG. 2 are preferably sidactor devices that provide the secondary level of over-voltage protection for the two-wire SHDSL port 46. Note that the primary level of protection is located external to the unit as is the usual practice of telephone companies. Under normal operating conditions, these sidactor devices CR11 and CR12 exhibit a high-impedance characteristic that results in minimal degradation of the balanced SHDSL signal at the port. When an over-voltage condition occurs at the port between the Tip (edge-finger pin 7 of the standard-mechanics Type 200™ printed circuit board) and frame-ground (FGND) and/or the Ring (edge-finger pin 13 of the standard-mechanics Type 200™ printed circuit board) and frame-ground, the corresponding sidactor crowbars into a low-impedance state. The resulting surge current is thereby shunted to frame-ground through the sidactor. The sidactor(s) remain in the low-impedance state until the shunted current falls below the holding-current threshold, at which point the device 10 transitions back to a high-impedance state. The specific devices chosen for CR11 and CR12 crowbar at a break-over voltage and have a holding current limit selected for optimized operation in accordance with an exemplary embodiment of the present invention.

Component U18 in FIG. 2 is preferably a combination low-capacitance steering diode/transient voltage suppressor (TVS) array combination (hereinafter referred to as a "diode array") that provides a tertiary level of over-voltage protection on the SHDSL port 46. The low-capacitance characteristic makes the diode array present a high shunt-impedance under normal operating conditions, which results in minimal degradation of the SHDSL signal. The diode array U18 is referenced to the supply rails for the SHDSL analog front-end IC 32 (U17) that is being protected. Positive surges in excess of the 5 V supply rail (CY_AFEVDD) are shunted to the 5 V supply rail by the steering diodes component of the diode array. Similarly, negative surges below the ground-reference rail (GND) are shunted to ground by the steering diodes. Under normal operating conditions, the TVS diode component of the diode array appears to be an open-circuit, but will begin to conduct when the reverse bias between the supply rails exceeds 5 V. The TVS diode then prevents bounce of the supply rails that may occur when surge currents are diverted to the rails by the steering diodes.

Components F2 and F3 in FIG. 2 are preferably fuses that have been specially designed by the manufacturer to meet the lightning surge and power fault requirements of GR-1089-CORE. As described previously, CR11 and/or CR12 will crowbar into a low-impedance state during an over-voltage condition, thereby shunting the resulting current to frame-ground. Current that enters the Tip (edge-finger pin 7 of the standard-mechanics Type 200™ printed circuit board) passes through fuse F3 before being shunted to frame-ground by CR12; likewise, current that enters the Ring (edge-finger pin 13 of the standard-mechanics Type 200™ printed circuit board) passes through fuse F2 before being shunted to frame-ground by CR11. Currents shunted to frame-ground during the Second-Level AC Power Fault tests are of sufficient magnitude and duration so as to cause fuses F2 and F3 to open, thereby protecting the wiring external to the unit, as well as assure that the EUT does not become a fire, fragmentation, or electrical safety hazard fuses. Fuses F2 and F3 are designed not to open during the test conditions presented by the First- and Second-Level Lightning Surge and First-Level AC Power Fault tests.

In accordance with an exemplary embodiment of the present invention, the 10/100BaseT Ethernet port 48 of the Ethernet transceiver 18 (FIG. 1) in the Ethernet extension device 10 of the present invention is depicted in more detail in the schematic of FIG. 3. FIG. 3 illustrates the PHY (U20) 14 described above as connected to the Ethernet transceiver. The RJ45 connector 12 described in FIG. 1 is shown as J4 in FIG. 3. Components U23, U24, U21, and U22 provide the over-voltage protection that allows the Ethernet extension device 10 of the present invention to survive and continue to operate properly following the battery of GR-1089-CORE Intra-Building Lightning Surge tests. U23 and U24 are also instrumental in allowing the device 10 to meet the GR-1089-CORE Second-Level Intra-Building AC Power Fault requirements. Fuses F4, F5, F6, and F7 operate in conjunction with U23 and U24 to protect external wiring from damage during the battery of GR-1089-CORE Second-Level Intra-Building AC Power Fault tests, as well as to assure the EUT (e.g., device 10) does not become a fire, fragmentation, or electrical safety hazard. The physical isolation of the primary and secondary windings on transformer device T3 also provides protection against longitudinal (common mode) surges.

Components U23 and U24 in FIG. 3 are preferably combination low-capacitance steering diode/TVS array combinations (hereinafter referred to as "diode arrays") that provide a secondary level of over-voltage protection on the four-wire 10/100BaseT Ethernet port (e.g., J4 or RJ45 connector 12). U23 protects the transmit side of the four-wire Ethernet interface 12, while U24 protects the receive side. The low-capacitance characteristic makes the diode arrays present a high shunt-impedance under normal operating conditions, which results in minimal degradation of the differential Ethernet signals that are present on both the transmit and receive sides of the interface (e.g., connector 12 of transceiver 18). When an over-voltage condition that exceeds the TVS diode breakdown voltage occurs on either the transmit or receive side of the port J4, the corresponding diode array clamps the differential voltage between the inputs. The resulting surge current is thereby shunted through the respective diode array. The specific devices chosen for U23 and U24 begin to breakdown at a voltage optimized for this circuit protection.

Components U21 and U22 of FIG. 3 are preferably combination low-capacitance steering diode/TVS array combinations (hereinafter referred to as "diode arrays") that provide a tertiary level of over-voltage protection on the 10/100BaseT Ethernet port. U21 protects the transmit side of the four-wire Ethernet interface 12, while U22 protects the receive side of interface 12. The low-capacitance characteristic makes the diode arrays present a high shunt-impedance under normal operating conditions, which results in minimal degradation of the Ethernet signals that are present on both the transmit and receive sides of the interface. The diode arrays are referenced to the supply rails for the Ethernet PHY device 14 (U20) that is being protected. Positive surges in excess of the 3.3 V supply rail (P3_3V) on either the transmit or receive side of the port 12 are shunted to the 3.3 V supply rail by the corresponding steering diodes. Similarly, negative surges below the ground-reference rail (GND) on either transmit or receive side of the port 12 are shunted to ground by the corresponding steering diodes. Under normal operating conditions, the TVS diode appears to be an open-circuit, but will begin to conduct when the reverse bias between the supply rails exceeds 3.3 V. The TVS diode then prevents bounce of the supply rails that may occur when surge currents are diverted to the rails by the steering diodes.

Components F4, F5, F6, and F7 of FIG. 3 are fuses that have been designed by the manufacturer to meet the lightning surge and power fault requirements of GR-1089-CORE. As described previously, U23 and U24 shunt surge currents that result from differential over-voltage conditions on the transmit and receive sides of the four-wire Ethernet port 12, respectively. Surge currents shunted by U23 pass through fuse F4 and fuse F5, while those shunted by U24 pass through fuse F6 and fuse F7. Currents shunted by U23 and U24 during differential over-voltage conditions of the Second-Level Intra-Building AC Power Fault tests are of sufficient magnitude and duration so as to cause fuses F4, F5, F6 and F7 to open, thereby protecting the wiring external to the unit, as well as assure that the EUT does not become a fire, fragmentation, or electrical safety hazard. Fuses F4, F5, F6, and F7 are designed not to open during the test conditions presented by the GR-1089-CORE Intra-Building Lightning Surge tests.

Figures 4A, 4B:
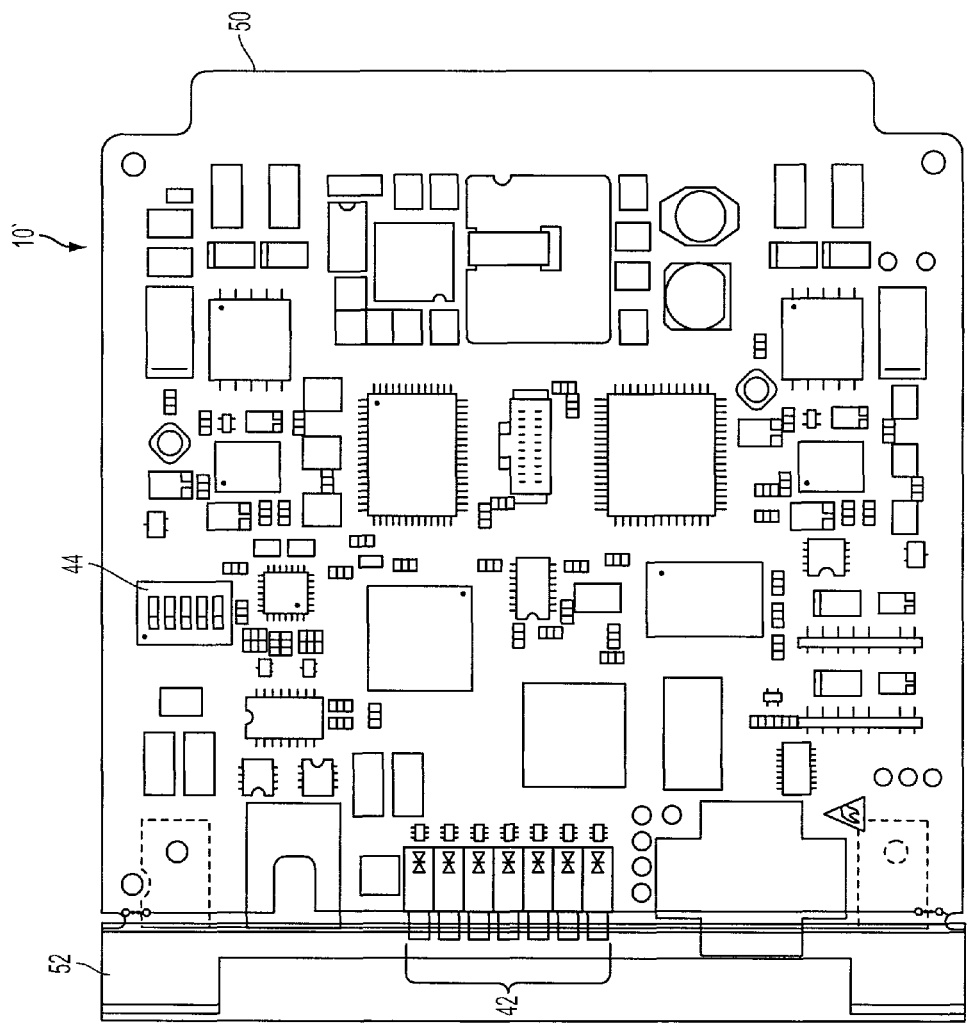
FIGS. 4A and 4B are, respectively, a side elevational view of an Ethernet extension device implemented as a plug-in card, and a front elevational view of the plug-in card faceplate in accordance with an exemplary embodiment of the present invention.
Figure 5C:
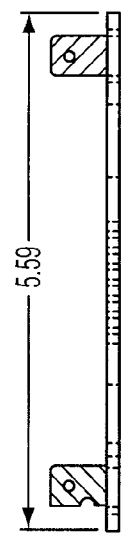
FIGS. 5A, 5B, 5C, 5D and 5E are, respectively, front elevational, perspective, side, front and top views of the faceplate depicted in FIG. 4B.
Figure 5E:
Figure 5B:
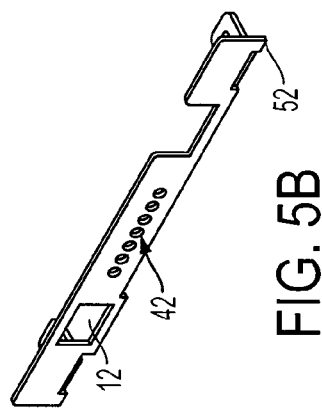
Figure 5D:
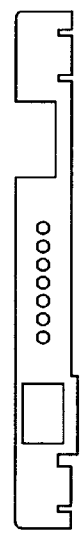
Figure 5A:
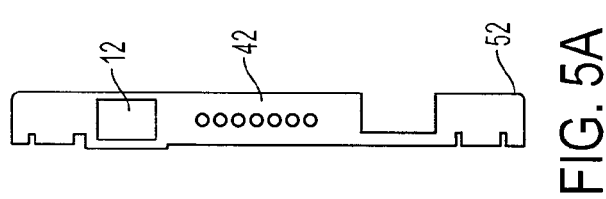

FIGS. 4A and 4B illustrate an exemplary embodiment of the Ethernet extension device 10' of the present invention implemented in a Type 200™ Mechanics card 50. FIG. 4A is a side view of the card 50 showing the circuit components described above in connection with FIGS. 1-3 thereon, among other components. The front panel 52 shown in FIG. 4B is described in more detail with respect to FIGS. 5A through 5E. It is to be understood that the Ethernet extension device 10' of the present invention can be implemented in essentially any telecommunications equipment standard mechanics plug-in card and therefore realizes a number of advantages over set-top box or "pizza" box Ethernet extensions or other network solutions such as simplified installation, less clutter and lower initial cost. For example, the plug-in card-type Ethernet extension device 10' of the present invention can be a single-width standard mechanics Type 3192 card.

As shown in FIGS. 5A through 5E, a plug-in card-type Ethernet extension device 10' configured in accordance with an exemplary embodiment of the present invention preferably has an RJ45 Ethernet interface jack 12 on the face plate or front panel 52 thereof. The RJ45 interface 12 preferably provides automatic Media Dependent Interface Crossover (MDIX) so that users can use either a straight-through or crossover Ethernet cable. The plug-in card-type Ethernet extension device 10' also has switches 44 and indicators 42 such as light emitting diodes (LEDs).

A printed-circuit-board mounted 5-position DIP switch 44 is preferably provided on the plug-in card-type Ethernet extension device 10' of the present invention as shown in FIG. 4A. Position 1 serves to enable automatic configuration of the Ethernet port 12 such that auto-negotiation of both data-rate and duplex and the automatic MDI-X feature are either simultaneously enabled or disabled. The two switch positions can be labeled AUTO and MAN. Position 2 selects a 10 or 100 BaseT Ethernet rate if the AUTO switch is set to MAN. The two switch positions can be labeled 10 and 100. Position 3 selects half- or full-duplex operation if the AUTO switch is set to MAN. The two switch positions can be labeled HALF and FULL. Position 4 selects either Central Office (line-terminating) or Remote Terminal (network-terminating) operation. The two switch positions can be labeled LT and NT. Position 5 selects 1 pair or 2 pair operation. If single pair operation is selected, Pair 1 used. The two switch positions can be labeled 1 and 1+2. These switches help to assure that an exemplary Ethernet extension device 10 constructed in accordance with an illustrative embodiment of the present invention is applicable to existing equipment of a broad range of Ethernet users as is required by a telephone company to provide uniform services to their customer base.

With continued reference to FIGS. 4A and 4B and FIGS. 5A through 5E, the faceplate 52 can preferably include the following LEDs: a UNIT LED that is Red for unit malfunction, and Green for normal unit operation; a LINK LED that is Green for normal Ethernet link operation and off to indicate Ethernet link failure; an ACT LED to convey the presence of data transfer activity on the Ethernet link (e.g., flashes or is steady yellow to indicate activity, and off otherwise); an AUTO LED that is Green to indicate that the AUTO DIP switch is in the AUTO position and off otherwise; a LT LED that is Green to indicate that the corresponding option DIP switch is in the LT (Central Office operation) position and off otherwise; OSP 1 and OSP 2 LEDs to indicate the status of each SHDSL wire pair (e.g., Green indicates conditions are normal, Yellow indicates link-up with the far end unit is in progress, and Red indicates failure of the SHDSL link). A DB9 Craft Port may be included to provide access to performance monitoring data collected from the SHDSL transceiver by the Host Processor. The −48VDC power input is provided with transient voltage and polarity protection to further suit telephone company standard-mechanics applications.

DC contact closure alarming is preferably provided on the plug-in card-type Ethernet extension device 10' in accordance with an exemplary embodiment of the present invention. Two DC contact closure alarms are connected to the edge connector as follows: Near-end Alarm: pins 5 (Tip1) & 15 (Ring1); and Far-end Alarm: pins 49 (Ring) & 55 (Tip). These pin numbers refer to those found on standard Type 200™ mechanics. A near-end failure (either or both telephone company Outside Plant (OSP) pair(s) or Ethernet port alarm causes a contact closure between edge connector pins 5 and 15. A far-end failure causes a contact closure between edge connector pins 49 and 55. A unit failure causes both pairs of alarm contacts to close. A power failure causes both pairs of alarm contacts to close.

The RJ45 jack 12 and Ethernet Activity LED 42 are preferably positioned in the upper part of the faceplate 52 and the DIP switch 44 and (if included) DB9 connector in the bottom so that the Ethernet extension device 10', when incased in a locking cover enclosure, can provide user access to only the Ethernet port 12. It is desirable but not required that the LEDs 42 be visible.

In accordance with another exemplary embodiment of the present invention, an Ethernet extension device 10" is implemented in a standard electrical wall box 54 such as a RACO 509 or similar standard electrical wall box or Carlon SC100RR or similar low voltage wall bracket, as shown in FIGS. 6A through 6D. The Ethernet extension device 10" comprises the components described above in connection with FIGS. 1, 2 and 3 packaged in a standard electrical wall box to avoid site clutter, improve device and connection security and simplify use. The exemplary plug-in embodiment of the present invention as a standard electrical wall box 10" allows for installation by electrical contractors or others besides higher paid IT professionals to reduce business costs. The wall box-type Ethernet extension device 10" is designed to preferably be a low voltage insert for standard 2 inch×3 inch electrical boxes to specifically address the non-telco electrical contractor market. As shown in FIG. 7, a low voltage DC power supply 56 is provided via a wall transformer, as opposed to the −48 VDC power input preferred by telephone companies.

Figure 6B:
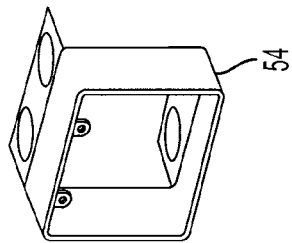
FIGS. 6A, 6B, 6C and 6D are perspective views of illustrative standard electrical wall boxes in which an Ethernet extension device can be implemented as a plug-in wall box-type device in accordance with an exemplary embodiment of the present invention.
Figure 6C:
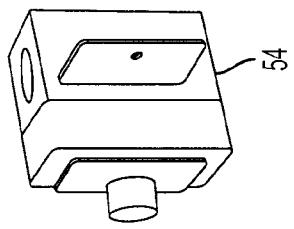
Figure 6D:
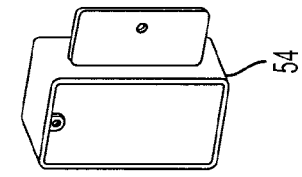
Figure 6A:
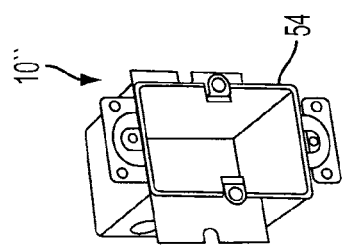
Figure 7:
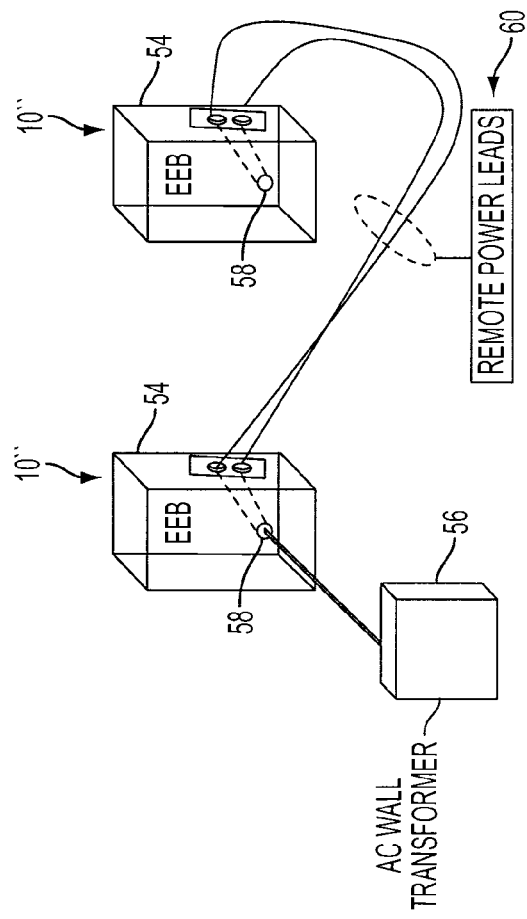
FIG. 7 depicts standard electrical wall box-type Ethernet extension devices connected in accordance with an exemplary embodiment of the present invention.
Figure 9:
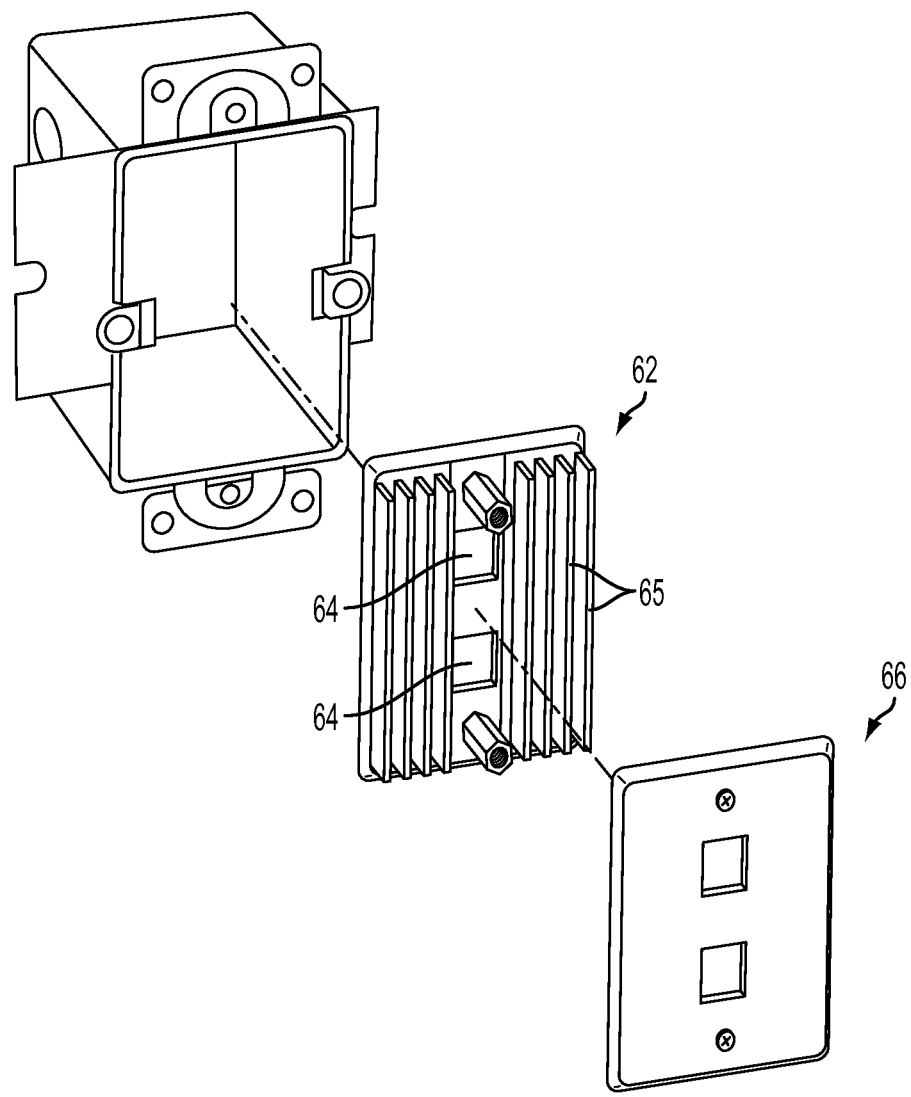
FIG. 9 depicts an exploded view of an illustrative standard electrical wall box in which an Ethernet extension device can be implemented as a plug-in wall box-type device as shown in FIG. 6a, vent holes, a heat sink and a face plate in accordance with an exemplary embodiment of the present invention.

With reference to FIG. 9, the standard electrical wall box-type Ethernet extension (EEB) device 10" illustrated in FIG. 6A can incorporate a wall face plate insert of standard dimension for access via openings 64 to a RJ45 connector 12 and a DC power jack 58 which are mounted to the front of the EEB device assembly so that a conventional rectangular face plate 66 can be used to complete installation. The face plate insert preferably comprises vent holes 65 and a heat sink 62 to reduce heat generated by components of device 10. The EEB device 10' can be optionally configured for local or remote operation so that the same unit can be used at either end of a circuit, as shown in FIG. 7, with remote power leads 60 being provided. One twisted pair interface via a 2-position screw terminal block is connected to the EEB device assembly. In use, a twisted pair is routed into the rear of the wall box then attached to the EEB device via this screw terminal strip. The EEB device is then mounted to the wall box with two standard screws.

SHDSL technology employed in the standard electrical wall box-type Ethernet extension (EEB) device 10" of the present invention provides compatibility with existing building circuits with a range of up to 3 kFt. (26 Gauge) with a data rate of up to 2.3 Mb/s. An RJ45 Ethernet jack is soldered to the EEB device. The RJ45 interface 12 provides automatic Media Dependent Interface Crossover (MDIX) so that users can use either a straight-through or crossover Ethernet cable. A port activity LED 44 that is on continuously or flashes yellow to indicate Ethernet activity may be included. A unit LED that is off if the unit is not powered, red if the unit malfunctions, yellow if it is not properly connected to a far end Ethernet extension device, and green otherwise may also be included. The RJ45 jack 12 is preferably wired in a conventional way as follows:

Position 1: Rx+ (Receive Tip)
Position 2: Rx− (Receive Ring)
Position 3: Tx+ (Transmit Tip)
Position 4: Unused
Position 5: Unused
Position 6: Tx− (Transmit Ring)
Position 7: Unused
Position 8: Unused The electrical wall box-type EEB device 10" performs auto-negotiation for 10 or 100 BaseT Ethernet rate. A standard, inexpensive, AC to DC wall transformer 56 is used to power the EEB device via a connector 58 soldered to the EEB device assembly that appears through the faceplate 52. A 2-position screw terminal positioned on the side of the EEB device can provide an alternate means of making the power connection or to remotely power a second EE device over limited distances via one or more additional twisted pair(s).

Unlike the card-type Ethernet extension device 10', no craft port, DC contact closure alarms or compatibility with span power plug-ins are preferably provided for the EE2 device 10'.

The plug-in card-type Ethernet extension device 10' and the standard wall box-type Ethernet extension device 10" described herein as exemplary embodiments of the present invention can be advantageously used by companies providing telecommunication services (RBOCs, CLECs, ILECs), distributors and end users (e.g., IT, industrial, utility and commercial applications) alike. These devices are small enough to fit into standard electrical wall boxes, as well as in the smallest of telephone closets, Digital Loop Carrier (DLC) remotes or Next Generation DLC (NGDLC) cabinets. For example, the single plug-in card can be dimensioned for deployment in a single card slot in a shelf of a telecommunications equipment bay (e.g., card dimensions that do not exceed an overall height of about 5.6 inches, and overall width of about 1.4 inches, and an overall depth of about 6 inches). Further, unlike many existing Ethernet extension solutions, the Ethernet extension devices of the exemplary embodiments of the present invention allow for not only Ethernet over twisted pair but also Ethernet connectivity to the telephone network (e.g., connection between a user's building and a telephone company building over existing outdoor telephone cables) since the devices have the protection components required by the telephone company.

Figure 8:
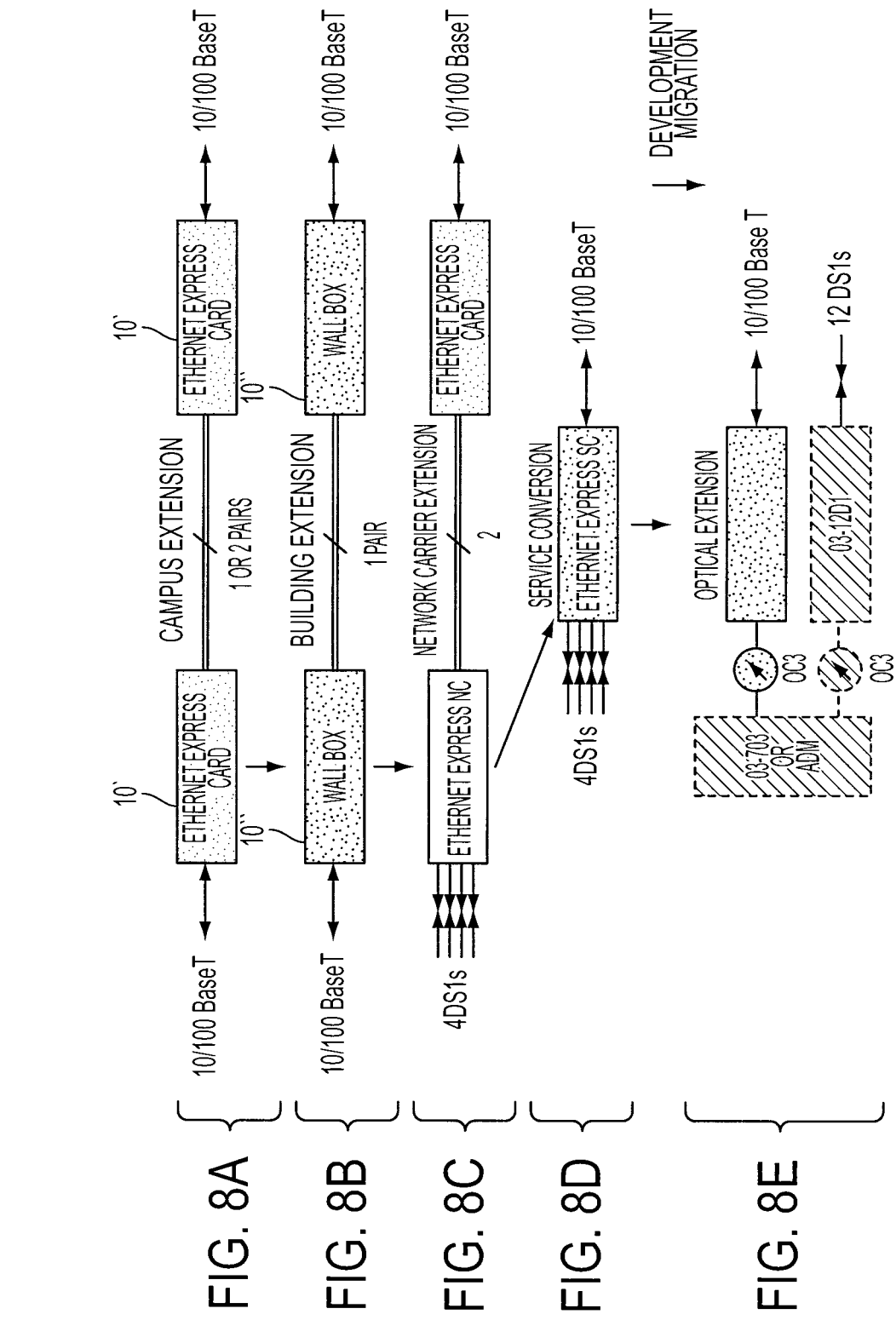
FIGS. 8A, 8B, 8C, 8D and 8E are block diagrams of different applications for an Ethernet extension device implemented as a plug-in device in accordance with exemplary embodiments of the present invention.

FIGS. 8A through 8E depict other implementations of Ethernet extension devices 10 in accordance with exemplary embodiments of the present invention to accommodate campus, industrial, network, and building Ethernet extension applications, as well as to provide Ethernet-to-DS1 service conversion for use with existing TDM networks. As shown in FIG. 8A, a campus extension using 1 or 2 twisted pairs is provided using, for example, a card-type Ethernet extension device 10' (e.g., standard Type 200™ or 3192 mechanics), as described above in connection with FIGS. 4A and 4B and FIGS. 5A through 5E. As shown in FIG. 8B, a building extension using 1 twisted pair is provided using, for example, a standard electrical wall box-type Ethernet extension device 10", as described above in connection with FIGS. 6A through 6D and FIG. 7. As shown in FIG. 7, a low voltage DC power supply 56 is provided via a wall transformer, as opposed to the standard −48 VDC power input preferred by telephone companies. The building extension can be useful for industrial complexes, schools, railroads, utilities, military sites, airports, hospitals, corporate and government offices, ISPs, and so on.

With continued reference to FIGS. 8C through 8E, a network carrier Ethernet extension is shown in FIG. 8C in accordance with another exemplary embodiment of the present invention. An Ethernet extension device 10 can be configured on a plug-in card 10' (e.g., a standard Type 400 mechanics card) to map Ethernet packets into 1 to 4 DS1s using multilink PPP (e.g., RFC1661: Point-to-Point Protocol, RFC1990: PPP Multilink Protocol, and RFC3518: Bridging Control Protocol) for network-wide transport via existing infrastructure. A service conversion Ethernet extension device is shown in FIG. 8D in accordance with another exemplary embodiment of the present invention. This device 10 can also be configured on a plug-in card 10' (e.g., a standard Type 400 mechanics card) to map Ethernet packets into 1 to 4 DS1s. Finally, an optical Ethernet extension device is shown in FIG. 8E in accordance with another exemplary embodiment of the present invention. This device 10 can also be configured on a plug-in card 10' (e.g., a standard Type 400 mechanics card) to map Ethernet packets into VT1.5(s) carried over an OC3 or higher speed (OC12, OC48, etc.) optical link using low order virtual concatenation, LO-VCAT, ITU G.707 and General Framing Procedure, GFP, ITU G.7041.

It is to be understood that exemplary embodiments of the present invention can be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention herein disclosed has been described by means of specific embodiments and applications thereof, numerous modifications and variations can be made thereto by those skilled in the art without departing from the scope of the invention as set forth in the claims.

What is claimed is:

1. An Ethernet extension device for extending Ethernet over twisted pair comprising:
    at least one Ethernet port for providing an Ethernet interface for receiving Ethernet signals from and transmitting Ethernet signals to an Ethernet cable connected thereto;
    one or more twisted pair ports, each of the twisted pair ports providing an interface to tip and ring conductors of a telephone network for receiving telephone network signals from and transmitting telephone network signals to a corresponding twisted pair of the telephone network;
    a twisted pair transceiver for receiving telephone network signals from at least one of the twisted pair ports;
    an Ethernet transceiver for receiving Ethernet signals from the Ethernet port, each of the twisted pair transceiver and the Ethernet transceiver comprising a communication interface device for communicating with each other, each communication interface device in the twisted pair transceiver and in the Ethernet transceiver having a compatible signal converting device for processing, respectively, the telephone network signals and the Ethernet signals into a compatible signal format that is used by both of the twisted pair transceiver and the Ethernet transceiver, the Ethernet transceiver and the twisted pair transceiver each being operable to format their respective processed signals for transmission to the Ethernet port and at least one of the twisted pair ports; and
    at least one of a single plug-in card dimensioned for deployment in a single card slot in a shelf of a telecommunications equipment bay, and a standard electrical wall box;
    wherein the at least one Ethernet port, the one or more twisted pair ports, the twisted pair transceiver, and the Ethernet transceiver are provided on the plug-in card or in the wall box.

2. An Ethernet extension device as claimed in claim 1, wherein the compatible signal format is High-level Data Link Control.

3. An Ethernet extension device as claimed in claim 1, wherein the twisted pair transceiver is configured to provide a digital subscriber loop (DSL) interface to the telephone network via the twisted pair.

4. An Ethernet extension device as claimed in claim 3, wherein the DSL interface is Symmetric High bit-rate DSL (SHDSL).

5. An Ethernet extension device as claimed in claim 1, further comprising telephone network protection circuitry connected to at least one of the twisted pair ports for providing protection against lightning surges and alternating current power faults required by the telephone network.

6. An Ethernet extension device as claimed in claim 5, wherein the Ethernet port, at least one of the twisted pair ports, the twisted pair transceiver, the Ethernet transceiver and the telephone network protection circuitry are provided in the plug-in card.

7. An Ethernet extension device as claimed in claim 6, wherein the single plug-in card dimensions do not exceed an overall height of approximately 5.6 inches, and overall width of approximately 1.4 inches, and an overall depth of approximately 6 inches.

8. An Ethernet extension device as claimed in claim 6, wherein the single plug-in card is configured in one of a standard Type 400™ and Type 200™ mechanics circuit board arrangement.

9. An Ethernet extension device as claimed in claim 5, wherein the telephone network protection circuitry is provided in the wall box.

10. An Ethernet extension device as claimed in claim 9, wherein the wall box is provided with a faceplate having at least one of a vent and heat sink.

11. An Ethernet extension device as claimed in claim 9, wherein the wall box is provided with a face plate comprising a power input and one of an Ethernet connector for connection to the Ethernet port and the Ethernet port.

12. An Ethernet extension device as claimed in claim 5, wherein the telephone network protection circuitry comprises at least one sidactor device connected across Tip and Ring connectors corresponding to the twisted port selected to crossbar from a high impedance state into a low impedance state when an overvoltage condition occurs between at least one of Tip and Ring and ground to shunt surge current to ground, and to transition to the high impedance state when the shunted current is below a selected threshold.

13. An Ethernet extension device as claimed in claim 5, further comprising a transformer and an analog front-end circuit connected between at least one of the twisted pair ports and the twisted pair transceiver, and wherein the telephone network protection circuitry comprises a low-capacitance steering diode and transient voltage suppressor (TVS) array combination connected across the analog front-end circuit to shunt surges in excess of a selected level on a power supply rail to the analog front-end circuit to the supply rail and to shunt surges below the ground reference for the supply rail to ground.

14. An Ethernet extension device as claimed in claim 5, wherein the telephone network protection circuitry comprises first and second fuses provided at respective ones of the Tip and Ring connectors of at least one of the twisted pair ports, the first and second fuses being selected to meet lightning surge and power fault requirements of the telephone network for outside telephone network circuits by opening and protecting telephone network wiring external to the Ethernet extension device when current shunted to frame ground are of a selected magnitude.

15. An Ethernet extension device as claimed in claim 5, wherein the Ethernet port is a 4-wire or 8-wire RJ45 connector having a transmit side and a receive side, and wherein the telephone network protection circuitry comprises two or more steering diode and transient voltage suppressor (TVS) array combinations connected respectively to the transmit side and the receive side and configured to provide overvoltage protection in the event of lightning surges and lightning surge tests and to meet AC power fault requirements of the telephone network by clamping differential voltage between corresponding ones of the four or eight wires when an overvoltage condition occurs that exceeds a TVS breakdown voltage and shunting the resulting surge current through the corresponding one of the steering diode and TVS array combinations.

16. An Ethernet extension device as claimed in claim 15, wherein the telephone network protection circuitry further comprises fuses provided at respective ones of the four or eight wires of the RJ45 connector and selected to open and protect wiring external to the Ethernet extension device when current shunted by the two or more steering diode and transient voltage suppressor (TVS) array combinations is of a selected magnitude.

17. An Ethernet extension device for extending Ethernet over twisted pair comprising:
  at least one Ethernet port for providing an Ethernet interface for receiving Ethernet signals from and transmitting Ethernet signals to an Ethernet cable connected thereto;
  one or more twisted pair ports, each of the twisted pair ports providing an interface to tip and ring conductors of a telephone network for receiving telephone network signals from and transmitting telephone network signals to a corresponding twisted pair of the telephone network;
  a twisted pair transceiver for receiving telephone network signals from at least one of the twisted pair ports;
  an Ethernet transceiver for receiving Ethernet signals from the Ethernet port, each of the twisted pair transceiver and the Ethernet transceiver being provided with a communication interface for communicating with each other having a compatible signal converting device for processing, respectively, the telephone network signals and the Ethernet signals into a compatible signal format used by both of the twisted pair transceiver and the Ethernet transceiver, the Ethernet transceiver and the twisted pair transceiver each being operable to format their respective processed signals for transmission to the Ethernet port and at least one of the twisted pair ports;
  telephone network protection circuitry connected to at least one of the twisted pair ports for providing protection against lightning surges and alternating current power faults required by the telephone network; and
  an Ethernet physical interface circuit connected between the Ethernet port and the Ethernet transceiver;
  wherein the Ethernet port is a 4-wire or 8-wire RJ45 connector having a transmit side and a receive side, and wherein the telephone network protection circuitry comprises two or more steering diode and transient voltage suppressor (TVS) array combinations connected respectively to the transmit side and the receive side and configured to provide overvoltage protection in the event of lightning surges and lightning surge tests and to meet AC power fault requirements of the telephone network by clamping differential voltage between corresponding ones of the four or eight wires when an overvoltage condition occurs that exceeds a TVS breakdown voltage and shunting the resulting surge current through the corresponding one of the steering diode and TVS array combinations;
  wherein the telephone network protection circuitry further comprises additional steering diode and transient voltage suppressor (TVS) array combinations connected respectively to the transmit side and the receive side and referenced to power supply rail for the Ethernet physical interface circuit, the additional steering diode and TVS array combinations being configured to shunt surges in excess of a selected level on the power supply rail to the power supply rail and to shunt surges below the ground reference for the supply rail to ground by the corresponding one of the additional steering diode and TVS array combinations.

18. An Ethernet extension device for extending Ethernet over twisted pair in a building, the building having at least one standard electrical wall box dimensioned for installation in a wall of the building and twisted pair cabling, the standard electrical wall box being connected to a twisted pair, the Ethernet extension device comprising:
  at least one circuit board configured to be mounted within the standard electrical wall box;
  a twisted pair interface that is connected to the end of the twisted pair that is provided to the standard electrical wall box and is operable to exchange telephone network signals between the at least one circuit board and the twisted pair; and
  an Ethernet interface that is configured to receive an Ethernet cable connected to the Ethernet extension device and is operable to exchange Ethernet signals between the Ethernet cable and the at least one circuit board;
  wherein the at least one circuit board comprises
    a twisted pair transceiver for receiving the telephone network signals from the twisted pair interface; and
    an Ethernet transceiver for receiving Ethernet signals from the Ethernet interface, each of the twisted pair transceiver and the Ethernet transceiver comprising a communication interface device for communicating with each other, each communication interface device in the twisted pair transceiver and in the Ethernet transceiver having a compatible signal converting device for processing, respectively, the telephone network signals and the Ethernet signals into a compatible signal format that is used by both of the twisted pair transceiver and the Ethernet transceiver, the Ethernet transceiver and the twisted pair transceiver each being operable to format their respective processed signals for transmission to the Ethernet port and at least one of the twisted pair ports.

19. An Ethernet extension device as claimed in claim 18, wherein the twisted pair is as long as 3000 feet.

20. An Ethernet extension device as claimed in claim 18, wherein the twisted pair interface comprises one or more twisted pair ports, each of the twisted pair ports providing an interface to tip and ring conductors of a telephone network for receiving telephone network signals from and transmitting telephone network signals to a corresponding twisted pair of the telephone network.

21. An Ethernet extension device as claimed in claim 18, wherein the twisted pair is at least one of intra-building twisted pair cabling, and outdoor telephone network twisted pair cabling.

22. An Ethernet extension device as claimed in claim 18, wherein the Ethernet interface comprises a 4-wire or 8-wire RJ45 connector.

23. An Ethernet extension device as claimed in claim 18, further comprising a face plate comprising at least one of vent holes and a heat sink connected to at least one of the circuit board and the standard electrical wall box.

24. An Ethernet extension device as claimed in claim 18, further comprising a DC power supply and a DC power jack connected to at least the face plate and the standard electrical wall box.

\* \* \* \* \*